United States Patent [19]

Isago

[11] 4,358,199
[45] Nov. 9, 1982

[54] SLIT-EXPOSURE TYPE ILLUMINATION APPARATUS

[75] Inventor: Koki Isago, Kawasaki, Japan

[73] Assignee: Ricoh Company, Ltd., Tokyo, Japan

[21] Appl. No.: 175,326

[22] Filed: Aug. 4, 1980

[30] Foreign Application Priority Data

Aug. 6, 1979 [JP] Japan .................................. 54-100127

[51] Int. Cl.³ .............................................. G03B 27/54
[52] U.S. Cl. .......................................... 355/70; 355/8; 355/11; 355/37
[58] Field of Search .......................... 355/70, 37, 8, 11

[56] References Cited

U.S. PATENT DOCUMENTS 3,720,465 3/1973 Bruce et al. ............................. 355/8
4,189,763 2/1980 Suzuki et al. .......................... 355/37

OTHER PUBLICATIONS

IBM Technical Disclosure Bulletin, vol. 14, No. 11, p. 3322, Apr. 1972.

*Primary Examiner*—Monroe H. Hayes
*Attorney, Agent, or Firm*—Wyatt, Gerber, Shoup, Scobey & Badie

[57] ABSTRACT

A slit-exposure type illumination apparatus capable of scanning a stationary original document by swinging an exposure lamp at a predetermined position and having side reflectors on the opposite sides of each linear light source and a pair of auxiliary plane reflectors which are disposed in the scanning direction of the illumination apparatus.

4 Claims, 8 Drawing Figures

SLIT-EXPOSURE TYPE ILLUMINATION APPARATUS

BACKGROUND OF THE INVENTION

The present invention relates to a slit-exposure type illumination apparatus for use in electrophotographic copying machines or the like. Conventionally, in a slit-exposure type illumination apparatus employing a cylindrical reflector having a quadratic surface and a linear light surface such as a halogen lamp, correction for reduced illumination in the peripheral portions of the image-formation optical system is achieved by varying or altering the location of the light source or the light-emitting portions thereof, or by utilizing side reflectors on opposite sides of each light-emitting portion. However, these methods are applicable only when the lengths of the optical paths from the light source to all the original scanning portions are equal. These conventional methods of correction are not applicable when the lengths of the optical paths vary depending upon the scanning position as in the case of a "search light" type original scanning apparatus. In such apparatus, the change in length of the optical path will bring about a change in distribution of illuminance, and thus a change in image density in the various portions of the original document being copied.

SUMMARY OF THE INVENTION

It is therefore an object of the present invention to provide a slit-exposure type illumination apparatus capable of providing the necessary distribution of illuminance even though the lengths of the optical paths vary according to the scanning position.

Another object of the present invention is to provide a slit-exposure type illumination apparatus of the above-mentioned type which is simple in construction and low in cost.

The slit-exposure type illumination apparatus according to the present invention comprises a pair of linear light sources, each of which is disposed near the focal line of a cylindrical reflector with a quadratic surface; plane reflectors disposed on the opposite sides of and perpendicular to the light-emitting portion of each light source; and a pair of auxiliary, plane reflectors whose effective reflecting surface areas gradually change in the scanning direction over the entire scanning length, and are also disposed perpendicular to the light-emitting portions of the light source. In a preferred embodiment of the present invention, the outer side reflectors and the auxiliary reflectors are disposed in the same perpendicular plane, and the auxiliary reflectors are in the shape of a chevron, with the peak at the scanning center, and gradually becoming lower and narrower in the two opposite peripheral directions from the peak. By use of the auxiliary reflectors, through appropriate design of the size and shape thereof, the distribution of illuminance determined solely by the side reflectors and the light sources, which illuminance would otherwise be unacceptably uneven, can be corrected, and the desired uniformity of illuminance achieved.

These and other objects will become more apparent from the following description and drawings.

DETAILED DESCRIPTION OF THE PREFERRED EMBODIMENT

Figure 1:
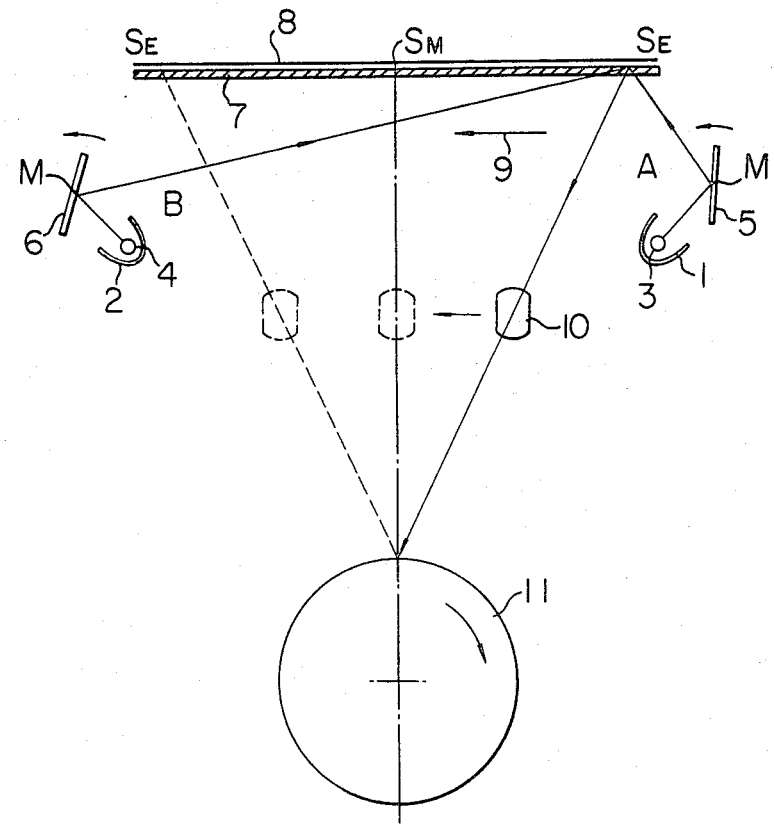
FIG. 1 is a schematic view of a slit-exposure type electrophotographic copying machine to which the present invention can be applied.

Referring to FIG. 1, there is schematically shown part of an electrophotographic copying machine in which an embodiment of a slit-exposure type illumination apparatus according to the invention can be employed.

In FIG. 1, reference numerals 1 and 2 each represent cylindrical reflectors having a quadratic surface, which are elliptic in cross section. Near the respective focal lines of the reflectors 1, 2, linear light sources 3, 4 are disposed, respectively. Of the luminous fluxes emitted from the linear light sources 3, 4, the luminous fluxes reflected by the reflectors 1, 2 respectively reach plane reflectors 5, 6, each rotating center of which, represented by reference symbol M, is fixed. By rotating the plane reflectors 5, 6 about their respective centers M, an original 8 placed on a contact glass 7 is subjected to scanning illumination in the direction of the arrow 9. These two illumination systems A and B having the above-mentioned function are disposed symmetrically with respect to a perpendicular line passing a scanning center $S_M$ as shown in FIG. 1. The plane reflectors 5, 6 are rotated synchronizingly so as to illuminate an identical portion of the original 8 simultaneously. Furthermore, an image-formation lens 10 is also moved in the direction of the arrow 9, parallel to the surface of the original 8, in synchronization with the above-mentioned illumination scanning, whereby the slit image of the original 8 is projected onto the surface of a photoconductor drum 11 which is rotated clockwise. The photoconductor drum 11 is disposed in such a manner that its rotating center is on the perpendicular line passing the scanning center $S_M$. Around the photoconductor drum 11 are arranged a charging apparatus, a development apparatus, an image transfer apparatus and other apparatuses (not shown) necessary for the electrophotographic copying process.

Figure 2:
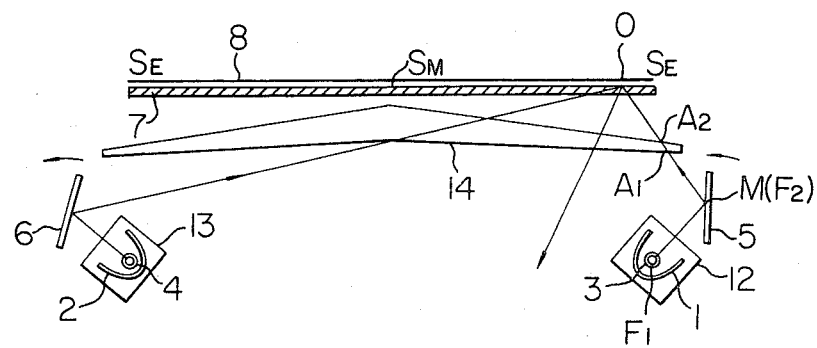
FIG. 2 is a schematic view of an embodiment of a slit-exposure type illumination apparatus according to the invention.
Figure 3:
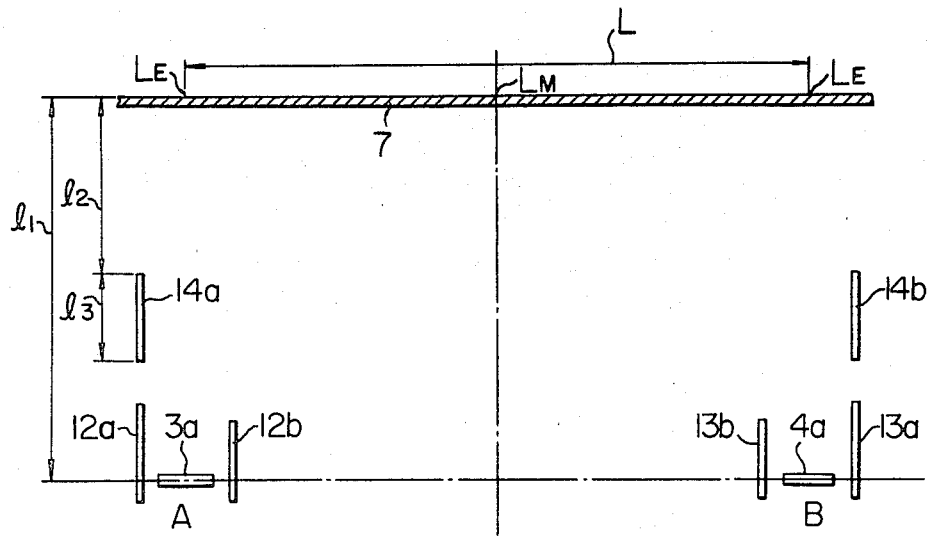
FIG. 3 is a side view of the slit-exposure type illumination apparatus of FIG. 2, principally showing the length of the optical path.

Referring to FIG. 2, there is schematically shown an embodiment of a slit-exposure type illumination apparatus according to the invention. FIG. 3 is a side view of the slit exposure type illumination apparatus in FIG. 2, which particularly shows the length of the optical path of the apparatus. In FIGS. 2 and 3, the same reference numerals employed in FIG. 1 are assigned to the same members as those in FIG. 1.

As shown in FIG. 3, side plane reflector 12 comprises a pair of reflector members 12a, 12b, the reflector member 12a being larger in size than the reflector member 12b. The reflector members 12a, 12b are positioned on the opposite sides of the light emitting portion 3a of one linear light source, with the reflector member 12a disposed on the outside and the the reflector member 12b disposed on the inner side of the light emitting portion 3a. Likewise a side plane reflector 13 comprises a pair of reflector members 13a, 13b, with the reflector member 13a being larger in size than the reflector member 13b and the reflector members 13a, 13b being disposed on the opposite sides of the light-emitting portion of the other linear light source, with the reflector member 13a disposed on the outside and the reflector member 13b disposed on the inner side.

An auxiliary plane reflector 14 comprising a pair of plane reflector members 14a, 14b each in the same general shape of a chevron, with the peak at the scanning center $S_M$, and gradually becoming lower and narrower in the opposite directions thereof, and are respectively disposed in the same vertical planes as those in which the outer reflector members 12a, 13a respectively exist.

Referring to FIG. 3, reference symbol $l_1$ represents the length of an illumination optical path, that is, the distance between the light source and the surface of the original. There exist countless illumination optical paths between the surface of the original and the light source. However, so long as the linear light source is disposed at the first focal point $F_1$ of the elliptic reflector, the position of the virtual light source formed by the cylindrical elliptic reflector is projected onto a cylinder having a radius equal to the major axis 2a of the elliptic reflector with the second focal point $F_2$. Therefore, by utilizing this property, the position of a reference virtual light source determined to be at the cross point of the major axis of the elliptic reflector and a circle with radius 2a. As shown in FIG. 2, the length of the optical path form the reference virtual light source to an arbitrary portion O of the original, $l_1$ is given by the following:

$$l_1 = 2\left(a - \sqrt{a^2 - b^2}\right) + \overline{F_1 M} + \overline{MA_1} + \overline{A_1 A_2} + \overline{A_2 O}$$

where b is the radius of the minor axis of the elliptic reflector. The height of the auxiliary plane reflector in FIG. 3, $l_3$, is given by $l_3 = A_1 A_2$ while $l_2 = A_2 O$.

Figure 4:
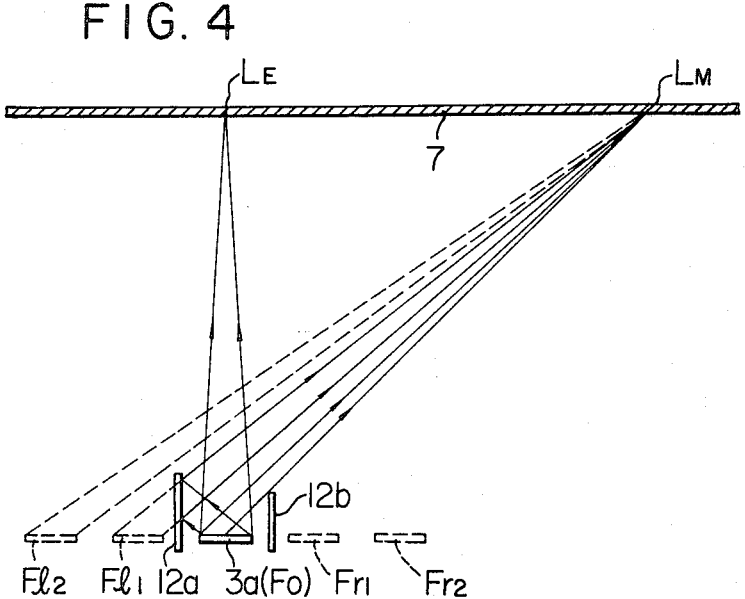
FIG. 4 shows the directions of travel of light when the side reflectors provide illumination in the embodiment of the slit-exposure type illumination apparatus of FIG. 2.

In order to investigate the illuminance in the longitudinal direction of the slit, the contribution to the illumination by the side reflectors, the light source, and the auxiliary reflectors, in the peripheral portions $L_E$ and central portion $L_M$ in the effective slit length L will now be investigated. Referring to FIG. 4, the contribution to the illumination only by the outer reflector member 12a, the inner reflector member 12b and the light-emitting portion 3a is shown. As can be seen from FIG. 4, all the luminous flux from the real light source $F_0$ is contributed to the illuminance in the peripheral portion $L_E$, while in the central portion $L_M$, part of the luminous flux from the real light source $F_0$ is contributed to the illumination. In the peripheral portion $L_E$, there is no contribution to the illumination by the virtual light source which is shown by the broken lines, while in the central portion $L_M$, only part of the luminous flux of the virtual light source $Fl_1$ makes contribution to the illuminance in FIG. 4, although that depends upon the boundary conditions of the side reflectors. As a matter of course, by scanning the boundary of the side reflectors, it would be possible to design the slit exposure type illumination apparatus in such a manner that the virtual light source illuminates the peripheral portion $L_E$ as well. In this case, however, such design will reduce the illumination in the central portion $L_M$. Therefore, in accordance with the conditions of a selected copying process, the boundaries of the side reflectors are determined. In any case, when the side reflectors are positioned on the opposite sides of the light source, the illuminance in the peripheral portion $L_E$ of the slit becomes greater than in the central portion $L_M$.

On the other hand, as mentioned previously, in the illumination apparatus as shown in FIG. 1, the length of the optical path for illumination changes successively in the course of scanning. For example, in the case of the illumination system A, the length of the optical path for illumination is lengthened as the scanning advances from the scanning initiation portion $S_E$ to the central portion $S_M$ and then to the other peripheral portion $S_E$. However, the boundary of the inner and outer reflectors does not change according to the change in length of the optical path for illumination. Therefore, the distribution of illuminance formed by the inner and outer reflectors and the light source changes depending upon the scanning portion of the original. As a result, the distribution of illuminance in the longitudinal direction of the slit in the peripheral portion $S_E$ in FIG. 1 becomes as shown by a curve 15 in FIG. 7. On the other hand, the distribution in the longitudinal direction of the slit in the original scanning central portion $S_M$ becomes as shown by a curve 16 in FIG. 8. In other words, when the side reflectors are disposed on the opposite sides of the light source, the illuminance in the peripheral portion $L_E$ of the slit is greater than that in the central portion $L_M$, but that change is greater in the scanning peripheral portion $S_E$ than in the scanning central portion $S_M$.

Figure 5:
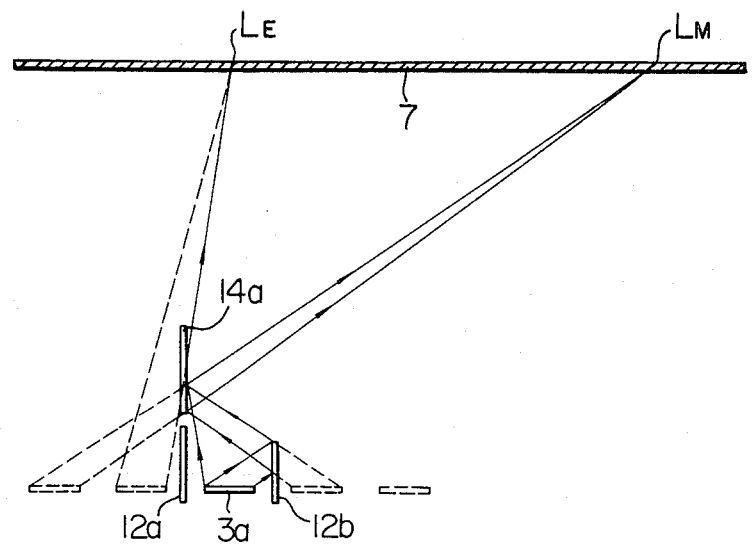
FIG. 5 shows the directions of travel of light when the auxiliary reflectors provide illumination in the embodiment of the slit-exposure type illumination apparatus of FIG. 2.
Figure 6:
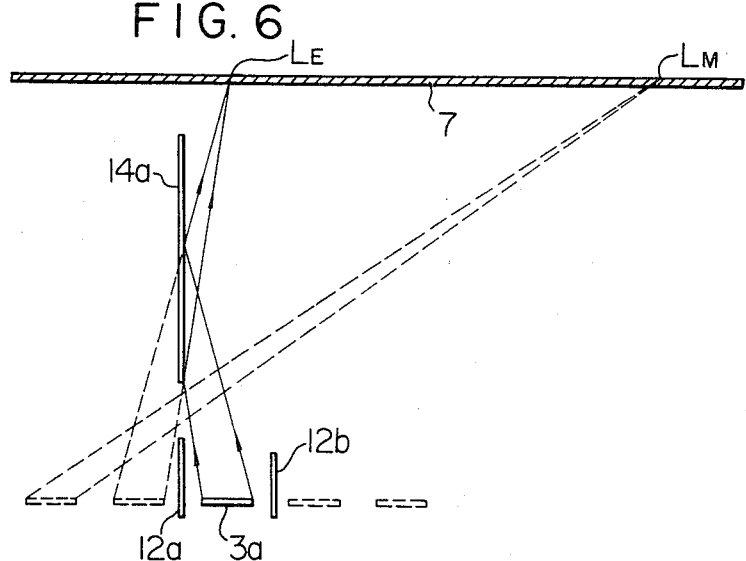
FIG. 6 shows the directions of travel of light when the auxiliary reflectors provide illumination in the central scanning portion in the embodiment of FIG. 2.

Next, the contribution of the auxiliary reflector, which is another main portion of the invention, to the illuminance will now be discussed. The auxiliary reflector 14 shown in FIG. 2 is essentially in a chevron shape, with its peak at the scanning center $S_M$, gradually sloping and narrowing in both directions from the peak. Because the height of the reflecting surface of the auxiliary reflector 14 is greatest from the base to the peak of its chevron shape, and gradually lessens toward both sides, the magnitude of its reflection of illumination will vary depending upon the scanning position, for instance, in the scanning peripheral portions $S_E$ and the scanning central portion $S_M$. FIG. 5 shows the directions of travel of light from the light-emitting portion 3a when the peripheral portion $S_E$ is scanned. FIG. 6 shows the directions of travel of light from the light-emitting portion 3a when the central portion $S_M$ is scanned. When the peripheral portion $S_E$ is scanned (FIG. 5), the relevant portion of the reflecting surface of the auxiliary reflector 14 is relatively narrow and the light reflecting portion of the auxiliary reflector 14 is relatively near the light-emitting portion 3a. The result is that when the peripheral portion $S_E$ is scanned, the auxiliary reflector 14 makes a relatively smaller contribution to the illumination of the peripheral portion $L_E$ in comparison with the illumination of the central portion $L_M$. In other words, the illuminance in the central portion $L_M$ is greater than that in the peripheral portion $L_E$ in the longitudinal direction of the slit.

Conversely, when the central portion $S_M$ is illuminated (FIG. 6), the relevant portion of the reflecting surface of the auxiliary reflector 14 is relatively wide and is relatively distant from the light-emitting portion 3a. The result is that the auxiliary reflector 14 makes a relatively greater contribution to the illumination of the peripheral portion $L_E$ in the longitudinal direction of the slit in comparison with the illumination of the central portion $L_M$.

Figure 7:
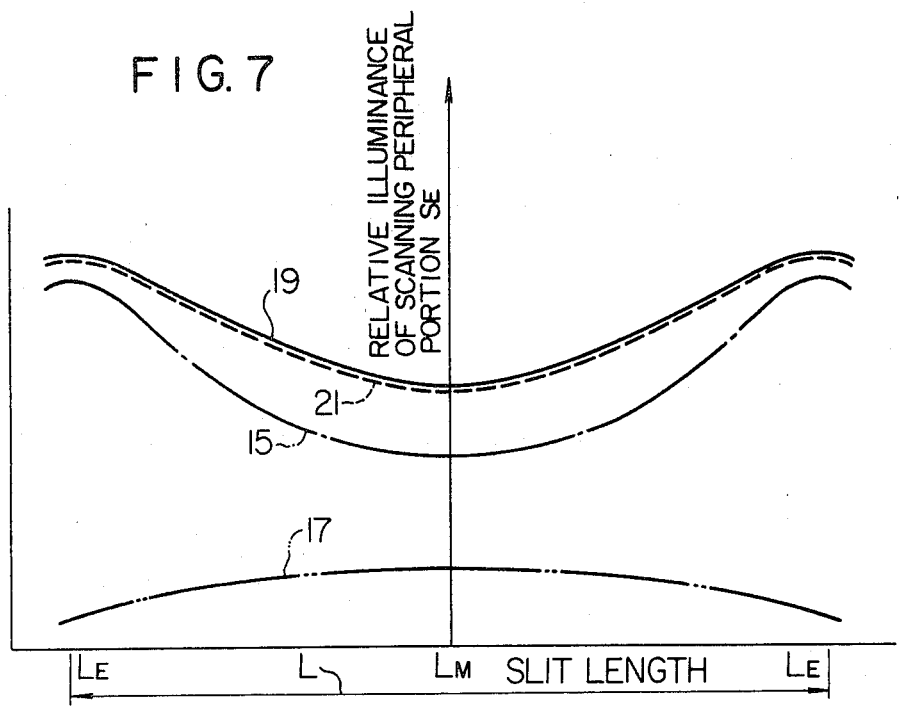
FIG. 7 shows the distributions of illuminance at various points in the peripheral portions in the scanning direction.
Figure 8:
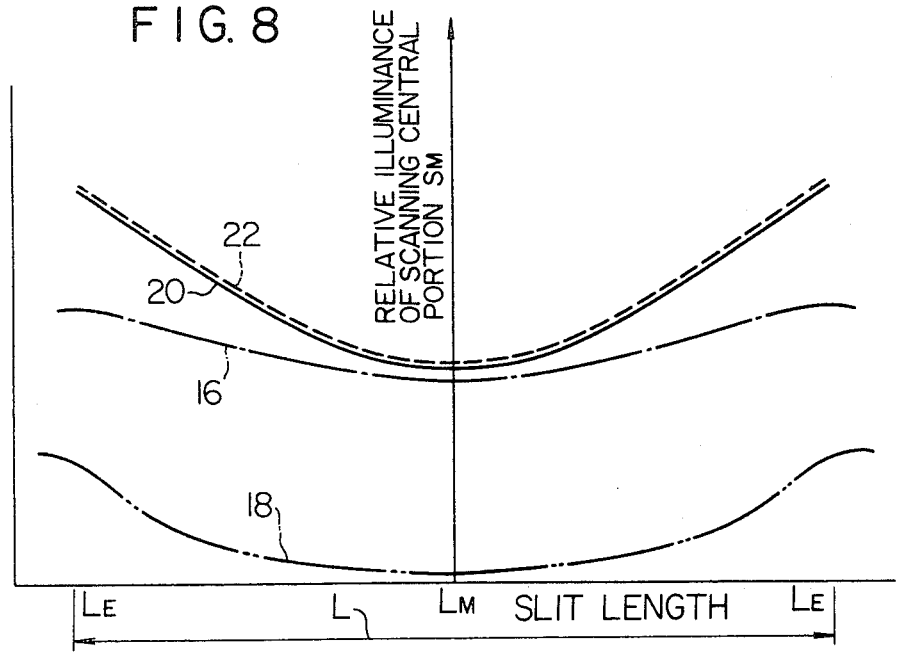
FIG. 8 shows the distributions of illuminance at various points in the central portions in the direction of the slit.

When only the contribution of the auxiliary reflector 14 to the illuminance is considered, the illuminance in the longitudinal direction of the slit at the scanning peripheral portion $S_E$ is shown by curve 17 in FIG. 7. As can be seen from FIG. 7, the illuminance is greater at the central portion $L_M$ than at the peripheral portions $L_E$. FIG. 8, curve 18, shows the contribution of the auxiliary reflector 14 to the illuminance of central portion $S_M$. As can be seen from FIG. 8, the illuminance is greater at the peripheral portions $L_E$ than at the central portion $L_M$, i.e., the effect is the reverse of that shown in FIG. 7.

In practice, the illumination of the original document is a synthesis of the illuminance from the auxiliary reflector 14 and the side reflectors at the light source. FIG. 7, curve 19, and FIG. 8, curve 20, show these synthesis at portions $S_E$ and $S_M$, respectively. As can be seen from FIGS. 7 and 8, the curves 19 and 20 respectively coincide with curves 21 and 22, which represent the preferred distribution of illumination.

In the invention, the lengths of the inner and outer reflectors and the light source are all constant. Therefore, the distribution of illuminance in the longitudinal direction of the slit, which is determined by these factors, is fixed for each scanning position. In contrast, the distribution of illuminance by the auxiliary reflector 14 in the scanning direction can be altered by varying the size and shape of the auxiliary reflector 14. Therefore, in other words, by appropriately designing the auxiliary reflector 14, variations in illumination in the scanning direction from only the inner and outer reflectors and the light source can be compensated for, so as to provide illumination in the scanning direction which coincides with the preferred condition.

The shape of the auxiliary reflector 14 is not limited to that shown in FIG. 2, but can be varied in accordance with the principles in the foregoing discussion, so as to provide the desired effect in conjunction with the side reflectors (inner and outer reflectors) and the light source.

While the invention has been described in conjunction with a specific embodiment therefor, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What is claimed is:

1. In an illumination apparatus for successively scanning elongate portions of a document with light, comprising at least one elongate light source each disposed near the focal line of a respective curved reflector, a planar reflector disposed adjacent each said light source for directing the light therefrom towards the document, and means for sweeping the light reflected from each said planar reflector across the document synchronously, the improvement wherein two planar side reflectors are disposed on the respective ends of each said light source, and a pair of auxiliary reflectors extending along the direction of scanning of said document on opposite sides thereof and each auxiliary reflector being essentially in the shape of a chevron with the peak thereof being located generally at the center of scanning of the document.

2. An apparatus according to claim 1, the two planar reflectors for each said light source including an inner reflector located adjacent the inner end of the respective light source and an outer reflector located adjacent the outer end of the respective light source, each inner reflector being lower in height than the outer reflector of the same light source.

3. An apparatus according to claim 2, including two of said light sources offset laterally with said outer reflector being on opposite sides of said apparatus.

4. An apparatus according to claim 3, said auxiliary reflectors being coplanar with a respective outer reflector.

* * * * *